United States Patent
Cheung et al.

(10) Patent No.: US 7,936,666 B2
(45) Date of Patent: May 3, 2011

(54) VIRTUAL ROUTER WITH A PRIORITY VALUE PER PORT

(75) Inventors: David Cheung, Cupertino, CA (US); Xiaohong Pan, Fremont, CA (US)

(73) Assignee: Foundry Networks, LLC, San Jose, CA (US)

( * ) Notice: Subject to any disclaimer, the term of this patent is extended or adjusted under 35 U.S.C. 154(b) by 257 days.

(21) Appl. No.: 12/106,176

(22) Filed: Apr. 18, 2008

(65) Prior Publication Data

US 2010/0149980 A1 Jun. 17, 2010

Related U.S. Application Data

(60) Provisional application No. 60/989,349, filed on Nov. 20, 2007.

(51) Int. Cl.
*G01R 31/08* (2006.01)
(52) U.S. Cl. .................................. 370/219; 370/220
(58) Field of Classification Search .................. 370/217, 370/218, 219, 220, 221; 709/224, 239, 240
See application file for complete search history.

(56) References Cited

U.S. PATENT DOCUMENTS

| | | | |
|---|---|---|---|
| 7,173,934 B2* | 2/2007 | Lapuh et al. | 370/392 |
| 7,486,610 B1* | 2/2009 | Bhupalam et al. | 370/216 |
| 2004/0133693 A1* | 7/2004 | Wils et al. | 709/230 |
| 2004/0215821 A1* | 10/2004 | Regan et al. | 709/240 |
| 2005/0111352 A1* | 5/2005 | Ho et al. | 370/219 |
| 2007/0153765 A1* | 7/2007 | Lei et al. | 370/351 |
| 2008/0101218 A1* | 5/2008 | Lei | 370/219 |
| 2008/0130490 A1* | 6/2008 | Yu et al. | 370/223 |
| 2008/0205402 A1* | 8/2008 | McGee et al. | 370/392 |
| 2009/0296565 A1* | 12/2009 | Kuo et al. | 370/219 |

* cited by examiner

*Primary Examiner* — Aung S Moe
*Assistant Examiner* — Awet Haile

(57) ABSTRACT

A virtual router spans a number of physical routing devices. A set of physical ports on one of the physical routing devices is logically represented as a trunk. A respective port priority value is associated with each of those ports, and a device priority value is associated with the physical routing device. If a port in the trunk is out-of-service, then the device priority value can be adjusted by the port priority value associated with the out-of-service port. A corrective action can be implemented if the device priority value fails to satisfy a condition. For example, the physical routing device may failover to another one of the physical routing devices spanned by the virtual router.

5 Claims, 3 Drawing Sheets

VIRTUAL ROUTER WITH A PRIORITY VALUE PER PORT

RELATED U.S. APPLICATION

This application claims priority to the copending provisional patent application, Ser. No. 60/989,349, entitled "A Virtual Router with a Priority Value per Port," with filing date Nov. 20, 2007, assigned to the assignee of the present application, and hereby incorporated by reference in its entirety.

BACKGROUND

A "virtual router" (an abstract representation of two or more physical routers acting as a group) can be used to increase the availability of a default gateway that services a host on a subnet. At any given time, only one of the physical routers (a "first router") is actually routing network traffic for the host; the Internet Protocol (IP) address for the first router serves as the IP address for the virtual router, and the host uses that IP address as its default gateway. If the first router is unable to satisfactorily service the host for some reason, then it can "failover" to another physical router (a "second router") that is spanned by the virtual router.

The Virtual Router Redundancy Protocol (VRRP) is used to assign responsibility for a virtual router to a physical router. According to VRRP, one of the physical routers in the group comprising the virtual router is assigned the highest priority (e.g., a value of 255) and consequently is identified as the owner or master, while the other physical routers in the group are assigned lower priorities and identified as backups. A backup can assume the role of master if the master cannot perform to a satisfactory level. If, for example, an interface (e.g., a port) on the master router fails, then the priority of the master router may be reduced. More specifically, according to VRRP, when an interface goes down (is out-of-service), then the priority of the master router is changed to the priority associated with the out-of-service interface. If the master's priority is reduced to less than the priority of the backup router with the next highest priority, then that backup becomes the master router.

SUMMARY

VRRP is effective but nevertheless there is room for improvement. An extended or enhanced version of VRRP, which may be referred to herein as VRRPE to distinguish it from the conventional VRRP standard, improves on VRRP by reducing a physical router's priority each time an interface on the router becomes unavailable. According to VRRPE, if a port on a physical router goes down, then the router's priority is decremented by a priority value associated with that port. For example, if a physical router's priority is 200 and a port on the router has a priority value of 20, then if that port goes down the router's priority is reduced to 180 (200 minus 20). If another of the router's ports goes down, and that port also has a priority value of 20, then the router's priority is again reduced, this time to 160. Once the router's priority falls to less than that of another physical router in the group comprising the virtual router, then the router fails over to the other router. Ports can have different priority values, allowing some ports to be ranked higher in importance than other ports.

Thus, one of the differences between VRRP and VRRPE is that, according to VRRPE, a router's priority is reduced each time one of its interfaces goes down.

In some virtual routers, a set of ports on a physical router is logically represented as a trunk. According to one VRRPE embodiment, the router's priority is reduced only when all of the ports belonging to the trunk are down.

In another VRRPE embodiment, a physical router's priority is decremented each time a port in a trunk goes down. Consequently, in a network topology in which multi-port trunks are used to handle high bandwidth traffic, when one or more of the ports in a trunk fail, failover to another physical router that has more bandwidth can occur.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
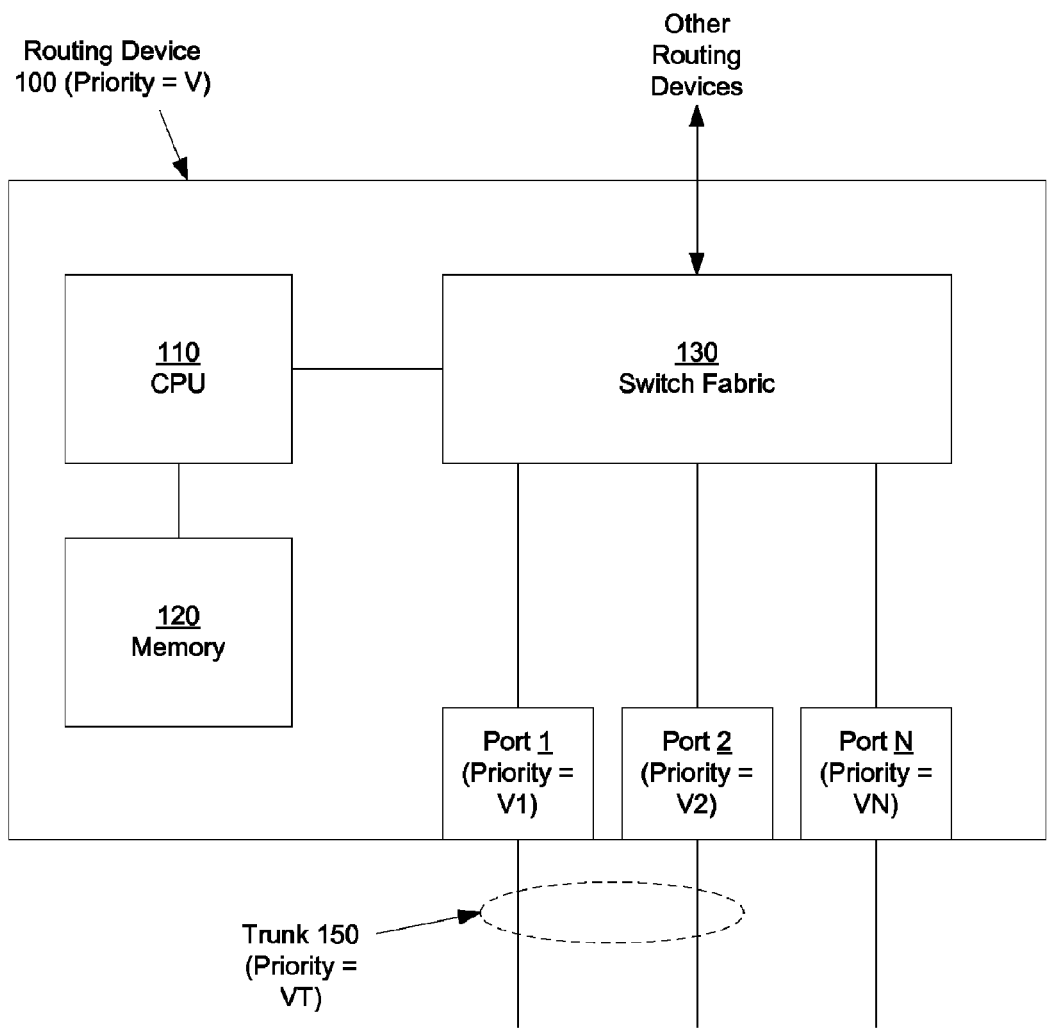
FIG. 1 is a block diagram showing an embodiment of a physical routing device that can be utilized in accordance with the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "monitoring" or "handling" or "identifying" or "adjusting" or "implementing" or "decrementing" or "routing" or "comparing" or the like, refer to the actions and processes of a computer system, or similar electronic computing device (e.g., a routing device such as a router or switch), that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments. By way of example, and not limitation, computer-usable media includes volatile and nonvolatile, removable and non-removable media implemented in any method or technology for storage of information such as computer-readable instructions, data structures, program modules or other data.

FIG. 1 is a block diagram showing selected elements of an embodiment of a physical routing device 100. Generally speaking, the routing device 100 is used to forward data (traffic) to its proper destination (e.g., another routing device or an end node). More specifically, the routing device 100 may be a router or a switch that is coupled to, or is a part of, the Internet or an intranet.

In the example of FIG. 1, the routing device 100 includes a central processing unit (CPU) 110, a memory 120, a switch fabric 130, and a number of ports 1, 2, . . . , N. The CPU 110, among its functions, provides hardware management functions, runs network control protocols, and executes the device's operating system. The memory 120, among its functions, stores instructions that can be executed by the CPU 110. The ports 1, 2, . . . , N provide connectivity to the Internet or intranet. The switch fabric 130 interfaces with the ports 1, 2, . . . , N and transfers packets between those ports. Also, the routing device 100 may be one of a number of routing devices that may be grouped (mounted) in a rack or chassis and that are in communication with one another. If so, the switch fabric 130 also interfaces with and facilitates the transfer of packets between the device 100 and those other routing devices.

A routing device utilized in accordance with embodiments of the present invention can include elements not shown in FIG. 1 or described herein. For example, a routing device may include elements such as, but not limited to, packet processors that are separate from the CPU 100, and memories (e.g., content addressable memories and buffers) other than the memory 120.

The ports 1, 2, . . . , N, or some subset thereof, can be grouped or logically represented as a "trunk" (an abstract representation of two or more physical ports acting as a group). That is, while each port acts as a separate physical link, a set of ports can be represented logically as a single link (a trunk). In the example of FIG. 1, the ports 1 and 2 are spanned by (are members of) a trunk 150. There can be more than one trunk per routing device.

According to embodiments of the present invention, each port in a trunk is associated with a respective priority value. In the example of FIG. 1, port 1 has a priority value V1, port 2 has a priority value of V2, and port N has a priority value of VN. The ports that are members of a trunk can have the same or different priority values. Thus, one port can be ranked higher in importance than another port.

A priority value VT can also be associated with the trunk 150. In one embodiment, the priority value VT of the trunk 150 is equal to or greater than (not less than) the sum of the priority values of the ports that are members of the trunk. Thus, in the example of FIG. 1, $VT \geq V1+V2$. Different trunks can have different priority values. Thus, one trunk can be ranked higher in importance than another trunk.

Furthermore, a priority value V is associated with the routing device 100.

Each of the priority values V, VT, and V1, V2, . . . , VN is a user-specified value; in one embodiment, a priority value is in the range of zero (0) to 255. The priority values are intelligently selected by the user based on various factors in order to establish a particular type of failover behavior and/or in order to rank the ports, trunks and routing devices. For example, a user may consider the amount of traffic (data) carried by each of the ports and assign priorities accordingly—a port that carries a higher volume of traffic may be considered more important than a port that carries a lower volume of traffic. In general, the priority of a port reflects the relative importance of each port, with importance being defined by the user.

As noted above, the trunk priority is at least equal to, but may be greater than, the sum of the priorities of its member ports. Thus, a trunk's priority can be increased depending on the relative importance of the trunk.

The priorities of the physical routing devices can be set to reflect the relative importance of each of the devices. The relative priorities of the physical routing devices can also be set to establish failover behavior. For example, if the priority for the master router is substantially greater than that of the backup router with the next highest priority, then a number of ports or trunks may have to fail before failover occurs. On the other hand, if the priorities of the master and backup are relatively close to each other, then perhaps only a single failure is needed to trigger failover.

Figure 2:
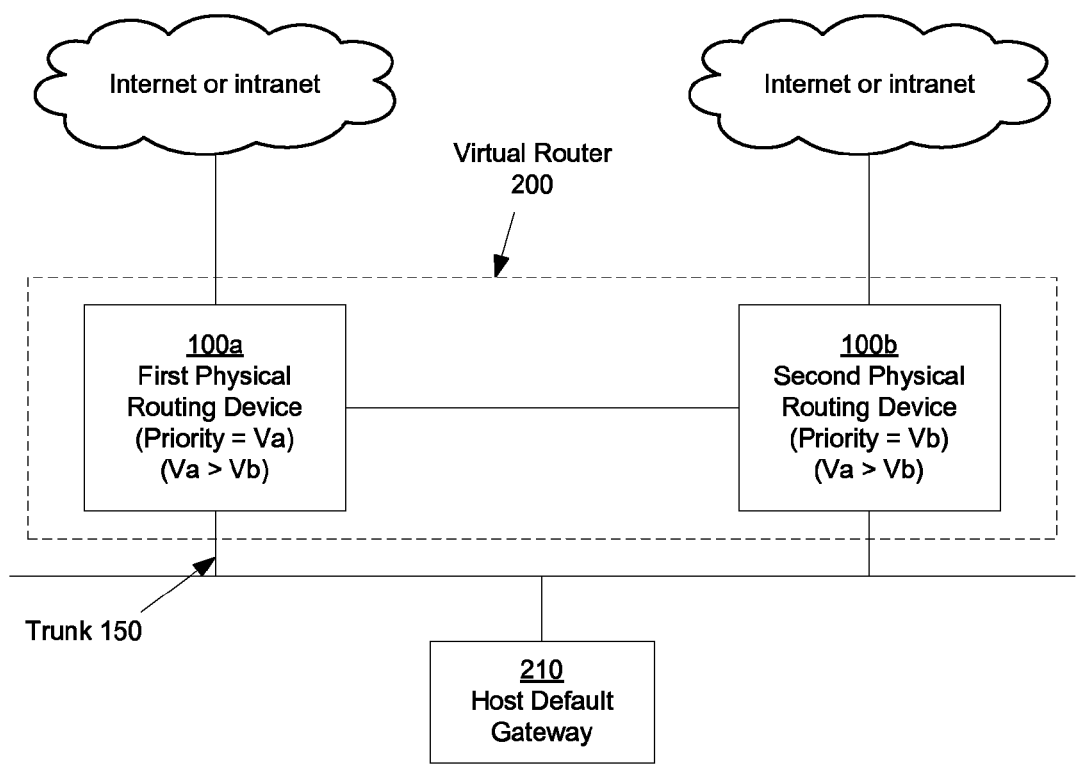
FIG. 2 is a block diagram showing a virtual router according to an embodiment of the present invention.

A virtual router can be configured to span a number of physical routing devices such as the device 100. FIG. 2 is a block diagram showing a virtual router 200 according to an embodiment of the present invention. The virtual router 200 is an abstract representation that spans multiple physical routers. In the example of FIG. 2, the virtual router 200 spans physical routing devices 100a and 100b, each of which may be exemplified by the routing device 100 of FIG. 1. A virtual router may encompass more than two physical routers. A virtual router identifier (VRID) is associated with the physical routers comprising the virtual router. In the example of FIG. 2, both of the physical routing devices 100a and 100b are assigned the same VRID (the VRID for the virtual router 200).

Priority values Va and Vb are associated with the routing devices 100a and 100b, respectively. In the example of FIG. 2, the physical routing device 100a has the highest priority (Va is greater than Vb). Thus, for the purpose of handling network traffic for the host 210, the physical routing device 100a may be identified as the master, with the physical routing device 100b (along with any other physical routing devices spanned by the virtual router 200) acting as backup.

As master, the physical routing device 100a will answer pings, Address Resolution Protocol (ARP) requests, and so on.

In general, an IP address is associated with the virtual router 200, and the host 210 points to the virtual router's IP address as its default gateway. According to VRRP, the virtual router 200 has an IP address that is one of the real or actual IP addresses of one of the physical routing devices comprising the virtual router. For example, an IP address for the physical routing device 100a can be used as the virtual router's IP address. According to VRRPE, the virtual router's IP address is user-configured and is in the same subnet as an interface configured on the virtual router, but cannot be the same as a real or actual IP address configured on the interface. According to both VRRP and VRRPE, if the master router (e.g., routing device 100a) fails over to a backup, the virtual router's IP address does not change.

There may be multiple hosts serviced by the physical routers 100a and 100b. In that case, more than one virtual router may span the same group of physical routers, with each virtual router servicing some subset of the hosts. For example, two virtual routers may span the physical routers 100a and 100b, with one physical router acting as the master and the other physical router acting as backup for one virtual router and one set of hosts; the roles of the physical routers would be reversed for the other virtual router and another set of hosts. Thus, one physical routing device can be the master for one virtual router and a backup for another virtual router; however, one physical routing device cannot be the master for one subnet on a virtual router and backup for another subnet on the same virtual router.

According to embodiments of the present invention, the availability of each of the ports 1, 2, . . . , N in the trunk 150 is monitored to determine whether or not each port is functioning properly. The monitoring function may be performed by the physical routing device on which the ports 1, 2, . . . , N reside, or it may be performed by another device (e.g., a centralized controller or management module, not shown) that is in communication with the various elements of the virtual router 200. In general, the virtual router 200 is provided with the functionality to monitor the status of the physical ports on each of its physical routing devices, to reduce the priority value associated with each of those physical routing devices when a port is removed from service, and to compare the priority values of those physical routing devices to determine which device is to act as master for a given host serviced by the virtual router. Additional information is provided in conjunction with FIG. 3.

Figure 3:
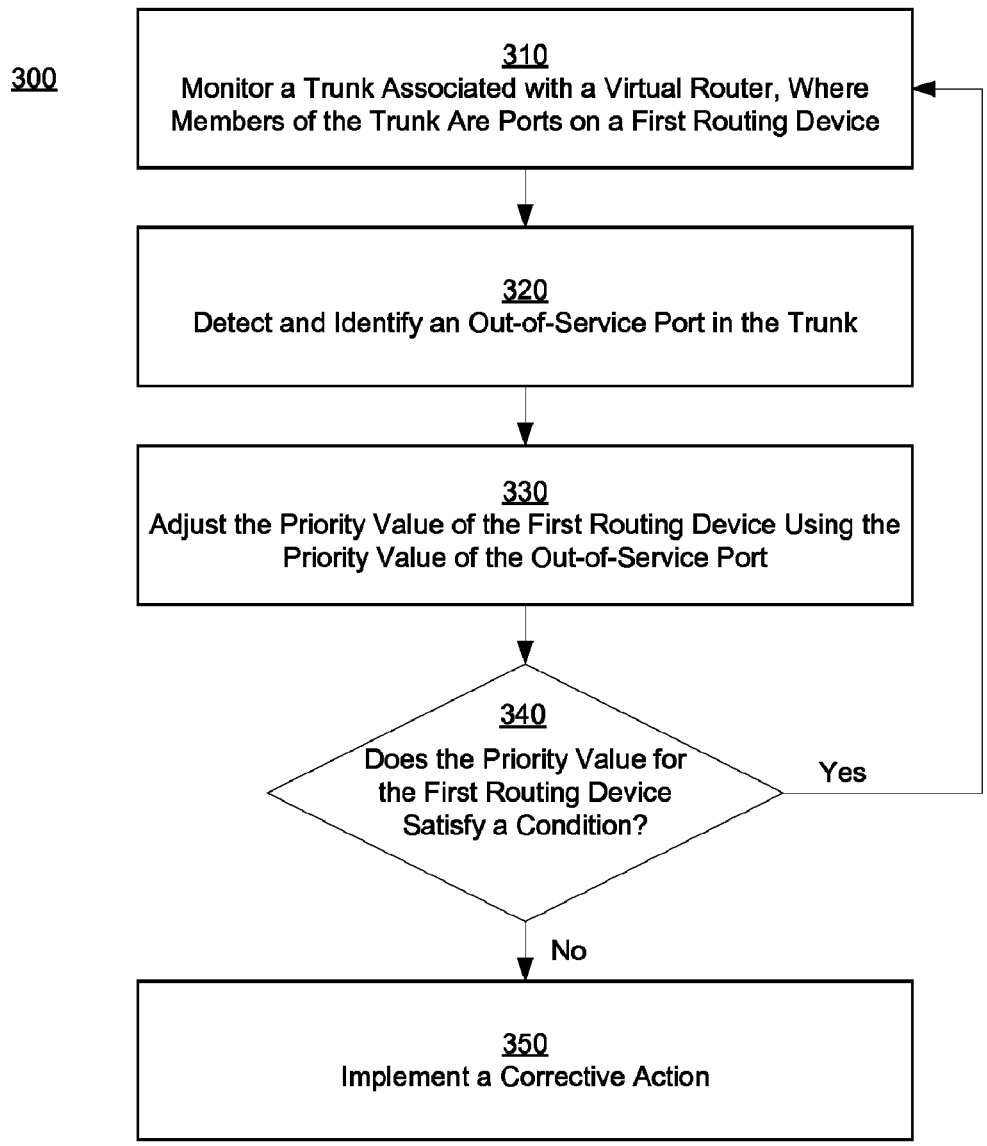
FIG. 3 is a flowchart of a computer-implemented method for managing a virtual router in one embodiment in accordance with the present invention.

FIG. 3 is a flowchart 300 of an example of a computer-implemented method for managing a virtual router in one embodiment in accordance with the present invention. Although specific steps are disclosed in the flowchart, such steps are exemplary. That is, embodiments in accordance with the present invention are well-suited to performing various other steps or variations of the steps recited in the flowchart 300. The steps in the flowchart may be performed in an order different than presented. In one embodiment, the method described by the flowchart 300 is implemented as instructions or components residing on a computer-usable medium (e.g., the memory 120 of FIG. 1) and executed by a processor (e.g., the CPU 110 of FIG. 1).

In block 310, a trunk (e.g., the trunk 150) associated with a virtual router (e.g., the virtual router 200) is monitored. The virtual router spans at least two physical routing devices (e.g., the devices 100a and 100b) that have device priority values Va and Vb, respectively. One of the physical routing devices (e.g., the device 100a, which may also be referred to herein as the first routing device) serves as the master and the other physical routing device (e.g., the device 100b, which may also be referred to herein as the second routing device) serves as a backup.

More specifically, in block 310, physical ports (e.g., the ports 1 and 2) on the first routing device that are members of the trunk are monitored. As noted above, port priority values V1 and V2 are associated with the ports 1 and 2, respectively.

In block 320, an out-of-service port (e.g., port 1) in the trunk 150 on the first (master) physical routing device is detected and identified. Any of a variety of known techniques may be used to detect and identify an out-of-service port.

In block 330, the device priority for the first physical routing device is adjusted using the priority value (V1) associated with the out-of-service port. In one embodiment, the device priority value for the first physical routing device is decremented by the priority value associated with the out-of-service port: Va(adjusted)=Va minus V1.

In general, a corrective action is implemented if the adjusted device priority fails to satisfy a condition (block 340). In one embodiment, the adjusted device priority is compared to a threshold value. In one such embodiment, the threshold value is the next highest priority value associated with one of the backup physical routing devices. That is, the adjusted device priority for the first physical routing device can be compared to the priority value associated with the backup physical routing device that has the highest priority next to that of the first routing device. In this example, the adjusted value of Va is compared to Vb. In this example, the condition is satisfied if the adjusted value of Va is greater than or equal to Vb.

If the condition is satisfied, then the flowchart 300 returns to block 310; otherwise, the flowchart 300 continues to block 350.

In block 350, a corrective action is implemented. In one embodiment, the corrective action constitutes failover from the first physical routing device to the backup physical routing device (e.g., the routing device 100b). More specifically, the traffic carried by the virtual router fails over from the first physical routing device to the backup physical routing device. As noted above, the first physical routing device may be a master in one virtual router while serving as a backup in another virtual router. Accordingly, should failover occur, the first physical routing device may still continue to serve as a backup for another virtual router.

It is also possible for the first physical routing device to act as master for a first virtual router and also as master for a second virtual router. After failover, the first physical routing device may no longer serve as master for the first virtual router but can continue to act as master for the second virtual router.

Blocks 310, 320 and 330 are repeated until all ports in a trunk are out-of-service or until the condition (block 340) is not satisfied, whichever occurs first. In one embodiment, in block 330, if all of the ports associated with a particular trunk are out-of-service, then the device priority (Va) is decremented by the priority value associated with the trunk: Va(adjusted)=Va minus VT. In such an embodiment, the value of VT is selected such that VT is greater than Va minus Vb so that failover is assured if all ports in the trunk are out-of-service.

Although the discussion above utilizes an example involving two physical routing devices and two ports, that discussion can be readily extended to scenarios involving more than two physical routing devices and more than two ports.

In summary, according to embodiments of the present invention, a physical router's priority is decremented each time a port in a trunk goes down. Consequently, in a network topology in which multi-port trunks are used to handle high bandwidth traffic, when one or more of the ports in a trunk fail, failover to another physical router that has more bandwidth can occur. Because there is a priority value associated with each port, and because the failure of each port in a trunk is individually accounted for, a user has increased flexibility in prescribing when failover will occur. Furthermore, a finer-grained failover protocol, based on the number of ports that fail within a trunk, can be instantiated.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of managing a virtual router that spans a first physical routing device and a second physical routing device, said method comprising:
    monitoring a trunk associated with said virtual router, said trunk comprising a plurality of physical ports of said first physical routing device and operable for handling network traffic for a host, wherein a respective port priority value is associated with each of said plurality of physical ports and wherein higher ranked ports of said plurality of physical ports have respective port priority values, greater than that of lower ranked ports of said plurality of physical ports, and wherein a trunk priority value is associated with said trunk, wherein said trunk priority value is greater than the sum of port priority values for all physical ports in said plurality of physical ports; and wherein a first device priority value is associated with said first physical routing device; and a second device priority value is associated with said second physical routing device;
    wherein said first device priority value is decremented by a first port priority value associated with a first out-of-service port to produce a first adjusted priority value for said first physical routing device, wherein said first physical routing device fails over to said second physical routing device if said first adjusted priority value is less than said second device priority value,
    wherein further said first adjusted priority value is decremented by a second port priority value associated with a second out-of-service port to produce a second adjusted priority value for said first physical routing device, wherein said first physical routing device fails over to said second physical routing device if said second adjusted priority value is less than said second device priority value; and
    wherein said first device priority value is decremented by said trunk priority value if said all physical ports in said plurality of physical ports are deemed out-of-service, wherein said trunk priority value is greater than the difference between said first device priority value and said second device priority value, thereby causing failover from said first physical routing device to said second physical routing device.

2. A method of managing a virtual router comprising a first physical routing device and a second physical routing device, said method comprising:
    monitoring a trunk of said virtual router, said trunk for handling network traffic for a host and comprising a plurality of interfaces of said first physical device including a first interface and a second interface;
    wherein higher ranked interfaces of said plurality of interfaces have respective interface priority values greater than that of lower ranked interfaces of said plurality of interfaces, and wherein a trunk priority value is associated with said trunk, wherein said trunk priority value is greater than the sum of interface priority values for all interfaces in said plurality of interfaces;
    decrementing a first device priority value associated with said first physical routing device by a first interface priority value associated with said first interface if said first interface is deemed out-of-service,
    thereby producing a first adjusted priority value for said first physical routing device, wherein said first physical routing device fails over to said second physical routing device if said first adjusted priority value is less than a second device priority value associated with said second physical routing device;
    decrementing said first adjusted priority value by a second interface priority value associated with said second interface if said second interface is deemed out-of-service, thereby producing a second adjusted priority value for said first physical routing device, wherein said first physical routing device fails over to said second physical routing device if said second adjusted priority value is less than said second device priority value; and
    decrementing said first device priority value by a trunk priority value associated with said trunk if all interfaces in said plurality of interfaces comprising said trunk are deemed out-of-service, wherein said trunk priority value is, greater than the difference between said first device priority value and said second device priority value, thereby causing failover from said first physical routing device to said second physical routing device.

3. The method of claim 2 wherein said first interface priority value is different from said second interface priority.

4. A computer-readable non-transitory medium having computer-executable components for managing routing devices, said components comprising:
    a virtual router that spans a first physical routing device and a second physical routing device, wherein a first device priority value is associated with said first physical routing device and a second device priority value is associated with said second physical routing device; and
    a trunk that spans a plurality of physical ports of said first physical routing device and operable for handling network traffic for a host, wherein a respective port priority value is associated with each of said physical ports, wherein higher ranked ports of said physical ports have respective port priority values ,greater than that of lower ranked ports of said physical ports, and wherein a trunk priority value is associated with said trunk, wherein said trunk priority value is greater than the sum of port priority values for all physical ports in said plurality;
    wherein said trunk is monitored to identify a port of said plurality of physical ports that is out-of-service, wherein said first device priority value is decremented by a first port priority value associated with a first out-of-service port to produce a first adjusted priority value for said first physical routing device, wherein said first physical routing device fails over to said second physical routing device if said first adjusted priority value is less than said second device priority value, wherein further said first adjusted priority value is decremented by a second port priority value associated with a second out-of-service port to produce a second adjusted priority value for said first physical routing device, wherein said first physical routing device fails over to said second physical routing device if said second adjusted priority value is less than said second device priority value; and wherein said first device priority value is decremented by said trunk priority value if said all physical ports in said plurality are deemed out-of-service, wherein said trunk priority value is, greater than the difference between said first device priority value and said second device priority value, thereby causing failover from said first physical routing device to said second physical routing device.

5. The computer-readable non-transitory medium of claim 4 wherein a first port priority value associated with a first port of said plurality of ports is different from a second port priority value associated with a second port of said plurality of ports.

* * * * *